United States Patent
Kasparian

(10) Patent No.: US 9,828,015 B2
(45) Date of Patent: Nov. 28, 2017

(54) SNOW BIKE

(71) Applicant: Theodore John Kasparian, Incline Village, NV (US)

(72) Inventor: Theodore John Kasparian, Incline Village, NV (US)

( * ) Notice: Subject to any disclaimer, the term of this patent is extended or adjusted under 35 U.S.C. 154(b) by 0 days.

(21) Appl. No.: 14/588,343

(22) Filed: Dec. 31, 2014

(65) Prior Publication Data

US 2015/0183452 A1   Jul. 2, 2015

Related U.S. Application Data

(60) Provisional application No. 61/922,798, filed on Dec. 31, 2013.

(51) Int. Cl.
| | |
|---|---|
| *B62B 17/08* | (2006.01) |
| *B62B 13/04* | (2006.01) |
| *B62B 17/04* | (2006.01) |
| *B62B 17/06* | (2006.01) |

(52) U.S. Cl.
CPC ............ *B62B 17/08* (2013.01); *B62B 13/046* (2013.01); *B62B 17/04* (2013.01); *B62B 17/062* (2013.01); *B62B 17/061* (2013.01)

(58) Field of Classification Search
CPC ......... B62B 13/16; B62B 13/04; B62B 13/14; B62B 13/046; B62B 17/08
USPC .......... 280/16, 21.1, 7.12, 11.12, 7.14, 28.11
See application file for complete search history.

(56) References Cited

U.S. PATENT DOCUMENTS

| | | | | |
|---|---|---|---|---|
| 3,561,783 A * | 2/1971 | Ellett | ...................... | B62B 13/16 280/16 |
| 4,101,142 A * | 7/1978 | Turner | .................... | B62B 13/14 280/16 |
| 4,244,436 A * | 1/1981 | Condon | ................. | B62M 27/02 180/191 |
| 4,286,682 A * | 9/1981 | Stewart | .................. | B62M 27/02 180/184 |
| 6,626,441 B1 * | 9/2003 | Hanson | ................... | B62B 13/04 280/7.14 |
| 6,783,134 B2 * | 8/2004 | Geary | .................... | A63C 5/031 280/16 |
| 7,537,221 B2 * | 5/2009 | Lasala | ..................... | B62B 13/04 280/11.12 |
| 7,726,667 B2 * | 6/2010 | Ferron | .................... | B62B 13/04 280/16 |
| 8,109,523 B2 * | 2/2012 | Kolesar | ................. | B61B 11/008 280/14.25 |

(Continued)

*Primary Examiner* — Hau V Phan
(74) *Attorney, Agent, or Firm* — Donald E. Schreiber

(57) ABSTRACT

A snow bike's three (3) piece chassis includes a frame disposed about the chassis' center. The chassis also includes an elongated, front fork, rotatably secured at an upper end of the frame's front end. A lower end of the front fork carries an elongated front snowboard. Lastly, the chassis includes a spring loaded swingarm that is pivotally secured to a rear end of the frame furthest from the front fork, and projects rearward therefrom. A distal end of the swingarm carries an elongated rear snowboard. A hole, that pierces the rear snowboard adjacent to its attachment to the swingarm, receives one end of a V-shaped plate that is rotatable so the plate's end projects beneath the rear snowboard into snow therebeneath. A coil spring, disposed between the swingarm and the V-shaped plate, draws the V-shaped plate's projecting end out of snow.

4 Claims, 7 Drawing Sheets

(56) References Cited

U.S. PATENT DOCUMENTS

| | | | | |
|---|---|---|---|---|
| 8,240,680 B2* | 8/2012 | Paganoni | ................ | B62B 13/04 |
| | | | | 280/28.11 |
| 2009/0230641 A1* | 9/2009 | Eugenio | ................. | B62B 13/16 |
| | | | | 280/16 |

* cited by examiner

SNOW BIKE

CLAIM OF PROVISIONAL APPLICATION RIGHTS

This patent application claims the benefit of U.S. Provisional Patent Application No. 61/922,798 filed on Dec. 31, 2013.

BACKGROUND

Technical Field

The present disclosure relates generally to conveyances, and more particularly to a conveyance which slides on two skis or snowboards, and which may be used on snow or other slippery surface.

Background Art

Conveyances which ride on ski-like boards rather than wheels are well know. Typically, such conveyances are used both for transportation and recreation on snow. For example U.S. Pat. Nos. 4,244,436 and 4,286,682 illustrate motorized versions of such conveyances on which an individual rides.

Unpowered conveyances used both for transportation and recreation on snow and upon which an individual rides are also known. For example, United States Patent Application Publication no. US 2009/0230641 ("the '641 publication") entitled "Snow Ski-Bike" discloses a conveyance that includes a seat upon which an individual rides. The disclosed snow ski-bike has a suspension system that includes front and rear ski pivot assemblies connected respectively at opposite ends of the ski-bike's main frame. The '641 publication depicts a ski attached to a lower surface of each ski pivot assembly that permits the attached ski to rotate about a horizontal axis passing therethrough. A horizontal leveler shock absorber connects between each ski pivot assembly and a forward end of the ski attached thereto. The '641 publication discloses that after the ski strikes an obstacle on terrain the horizontal leveler shock absorber, upon cycling though its rebound phase, returns the ski to the ski's true horizontal orientation. The '641 publication also depicts a hand operated brake attached to a rear end of each ski. The '641 publication's FIG. 3 depicts a rear pivoted double swingarm included in the frame that operatively connects between the rear ski pivot assembly and the ski-bike's main frame. The '641 publication also discloses a rear suspension shock absorber that connects between the ski-bike's main frame and the rear pivoted double swingarm.

U.S. Pat. No. 7,537,221 entitled "Snow-Sliding Vehicle" ("the '221 patent") has an overall configuration similar to the "Snow Ski-Bike" disclosed in the '641 publication. The '221 patent's "Snow-Sliding Vehicle" slides on a rear bearing runner and a front directional runner respectively located at opposite ends of a stiff frame. A pivoting steering column, that includes a fork having axial dampeners, extends downward from one upper end of the stiff frame to the front directional runner. Rotatable joints interconnect the lower end of the forks included in the steering column to the directional runner so the runner is free to rotate about a horizontal axis. A dampening device disclosed in the '221 patent also interconnects the directional runner to lower end of the fork. A flat base, upon which an individual stands while riding the vehicle, that is located at the rear end of the stiff frame, includes a hinged rear portion. A dampening device also interconnects the hinged rear portion of the base with the '221 patent's stiff frame. A dual parallel knuckle joint, that extends downward beneath the base, interconnects between a forward end of the base and the front end of the bearing runner. A transverse joint, that depends beneath the hinged rear portion of the base, is also fastened to the bearing runner. This arrangement locates the bearing runner beneath the base substantially parallel to the front, unhinged portion of the base. The '221 patent discloses a dampening device fastened at one end to the stiff frame, that extends downward therebelow and passes through the dual parallel knuckle joint, to be fastened at an opposite end thereof to the front end of the bearing runner. Separation of the base into two portions interconnected by the hinge in combination with the interconnecting pairs of joints and corresponding dampening devices allows a folding movement at the rear end of the vehicle so the bearing runner is free to adapt to a sliding surface's topography without burdening the vehicle's freedom of displacement by a user's weight.

U.S. Pat. No. 6,783,134 entitled "Ski Vehicle" ("the '134 patent") has an overall configuration similar to that of the "Snow Ski-Bike" disclosed in the '641 publication and the vehicle disclosed in the '221 patent. The '134 patent's vehicle includes frame that can be collapsed into a substantially compressed configuration so the vehicle can be transported in a car or plane. A lower end of a moveable parallelagramic linkage included in the frame has a pair of pivot points at which the rear ski attaches to the frame. To provide a smoother ride, a shock absorber, mounted within the parallelagramic linkage, compresses and dampens the vehicle's motion when the rear ski encounters irregularities in topography. The parallelagramic linkage maintains the rear ski in an essentially fixed orientation with respect to the frame and restricts the rear ski from freely pivoting around the pivot points located where the rear ski attaches to the frame. Instead, rear ski moves substantially parallel to a lower portion of the frame to provide a smoother ride for the ski vehicle's rider. The frame disclosed in the '134 patent also includes a foot pedal that when depressed rotates a skid plate, located where the rear ski attaches to the parallelagramic linkage, downward through a hole that pierces a rear ski into snow beneath the rear ski.

BRIEF SUMMARY

An object of the present disclosure is to provide an improved, unpowered conveyance for riding across a surface of a snowy slope.

Another object of the present disclosure is to provide an improved, unpowered conveyance that facilitates handicapped individuals participation in winter recreation.

Yet another object of the present disclosure is to provide an improved, unpowered conveyance for riding across a surface of a snowy slope that includes at least one front snowboard, the conveyance being configured to reduce any tendency for a font end of the front snowboard toward becoming embedded in snow.

Briefly, a snow bike in accordance with the present disclosure for conveying a rider thereon across a surface of a snowy slope has a three (3) piece chassis. Specifically, the snow bike's chassis includes a frame disposed about a center of the chassis.

An elongated front fork included in the chassis is secured at an upper end of the front fork to a front end of the frame. The attachment of the front fork to the frame permits the front fork to rotate with respect to the frame about an axis that is oriented substantially parallel to a longitudinal axis of the front fork. An upper end of the front fork that extends above the frame has a handlebar fixed thereto to permit the rider to establish an angular relationship between the front fork and the frame. Attached at a lower end of the front fork are:
1. a front snowboard mounting bracket that is located between a pair of tines of the fork;
2. a shaft that passes through the front snowboard mounting bracket so the front snowboard mounting bracket is rotatable about the shaft, the shaft spanning between tines of the front fork that are located on opposite sides of the front snowboard mounting bracket and being secured respectively at opposite ends thereof to the tines; and
3. an elongated front snowboard having a lower surface adapted for contacting snow and also having both a length and a width, the front snowboard being securely fastened to the front snowboard mounting bracket, the length of the front snowboard being pointable along a direction in which the snow bike travels across the surface of the snowy slope by rotating the front fork with respect to the frame.

Configured in this way the combined front snowboard mounting bracket and the front snowboard freely rotate unconstrained about the shaft for conforming a lower surface of the front snowboard to topography of a snowy slope while the snow bike moves across the surface of the snowy slope.

A swingarm also included in the chassis projects rearward from a rear end of the frame furthest from the front fork. A front end of the swingarm is secured to the frame by a pair of swingarm pivot mounts included in the frame. The swingarm pivot mounts respectively confront opposite sides of the swingarm for permitting the swingarm to rotate with respect to the frame about an axis that is oriented parallel to the swingarm pivot mounts. Attached at an end of the swingarm furthest from the frame are:
1. a rear snowboard mounting bracket;
2. a bolt that passes through both:
   a. the end of the swingarm furthest from the frame; and
   b. the rear snowboard mounting bracket;
3. an elongated rear snowboard that is securely fastened beneath the rear snowboard mounting bracket and has a lower surface adapted for contacting snow;
4. a V-shaped plate through one end of which the bolt also passes and about which the plate is rotatable, rotation of the V-shaped plate in one direction about the bolt extending an end of the V-shaped plate furthest from the bolt progressively through both:
   a. a notch formed in one edge of the rear snowboard mounting bracket; and then
   b. a hole that pierces through the rear snowboard where the rear snowboard is securely fastened beneath the rear snowboard mounting bracket, such rotation of the V-shaped plate extending the end thereof that is furthest from the bolt downward into snow that is in contact with a lower surface of the rear snowboard for impeding descent of the snow bike across the surface of the snowy slope; and
5. a coil spring that connects at one end to the swingarm and at an opposite end of the coil spring to the V-shaped plate near the bolt for applying a force to the V-shaped plate that urges rotation of the V-shaped plate in a direction that retracts the end of the V-shaped plate furthest from the bolt upward out of snow that is in contact with a lower surface of the rear snowboard to thereby ease descent of the snow bike across the surface of the snowy slope upon rotation of the V-shaped plate by force applied thereto by the coil spring.

An elongated shock absorber also included in the chassis connects at one end to the frame and at an opposite end to the swingarm for inhibiting rotation of the swingarm with respect to the frame.

The preceding configuration of the swingarm with respect to the frame permits a lower surface of the rear snowboard to conform to topography of a snowy slope while the snow bike moves across the surface of the snowy slope by a combination of:
1. free, unconstrained rotation of the combined rear snowboard mounting bracket and the rear snowboard about the bolt with respect to the end of the swingarm furthest from the frame; and
2. rotation of the swingarm with respect to the frame that is inhibited by the shock absorber that is connected therebetween.

These and other features, objects and advantages will be understood or apparent to those of ordinary skill in the art from the following detailed description of the preferred embodiment as illustrated in the various drawing figures.

DETAILED DESCRIPTION

Figure 1:
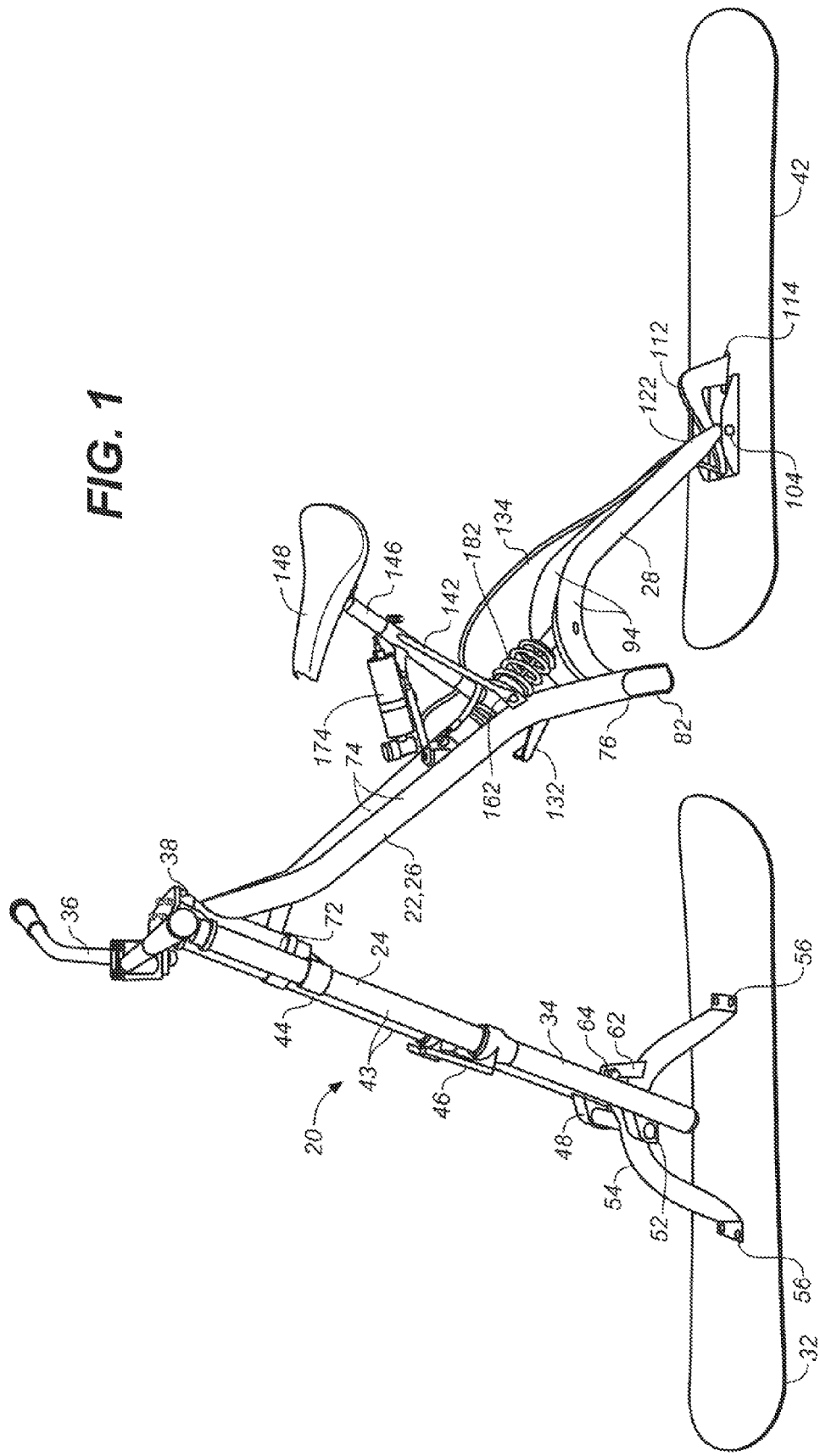
FIG. 1 is an elevational view depicting a snow bike in accordance with the present disclosure that includes:
 a. a front snowboard fastened to a lower end of a steerable front fork included in the snow bike's chassis; and
 b. a rear snowboard fastened at a rear end of snow bike's frame to a projecting end of a hinged swingarm included in the snow bike's chassis.
Figure 2:
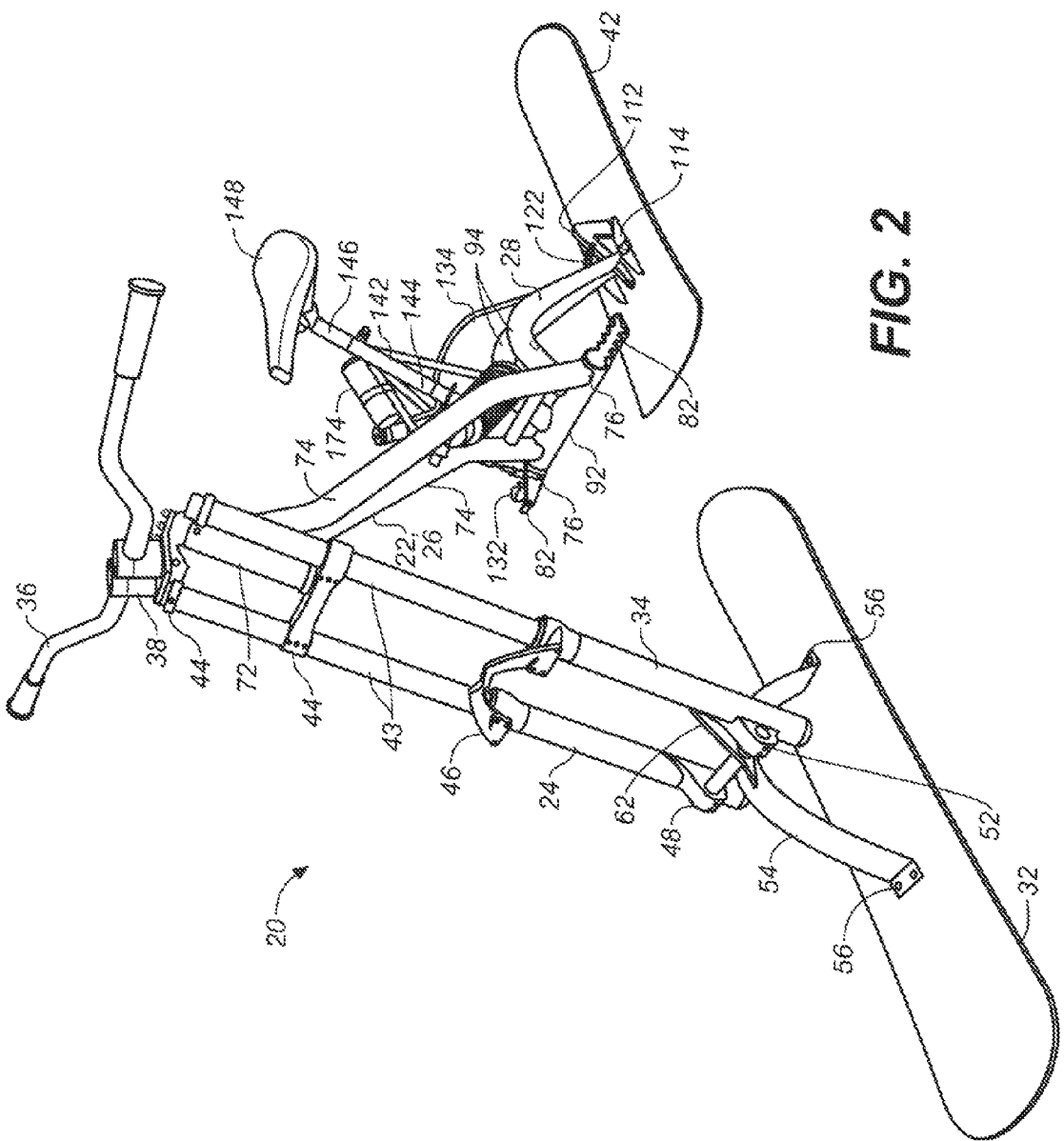
FIG. 2 is an oblique frontal view of the snow bike taken along the line 2-2 in FIG. 1.

FIGS. 1 and 2 depict a snow bike referred to by the general reference number 20. The snow bike 20 includes a three piece chassis 22 having:
1. a steerable front fork 24;
2. a frame 26 to a front end of which the front fork 24 attaches; and
3. a moveable swingarm 28 attached an end of the frame 26 furthest from the front fork 24.

A front snowboard 32 is located beneath a lower end 34 of the front fork 24 to which a handlebar 36 is attached at an upper end 38 thereof furthest from the front snowboard 32.

A rear snowboard 42 is attached to an end of the swingarm 28 that projects outward from the frame 26.

Figure 3:
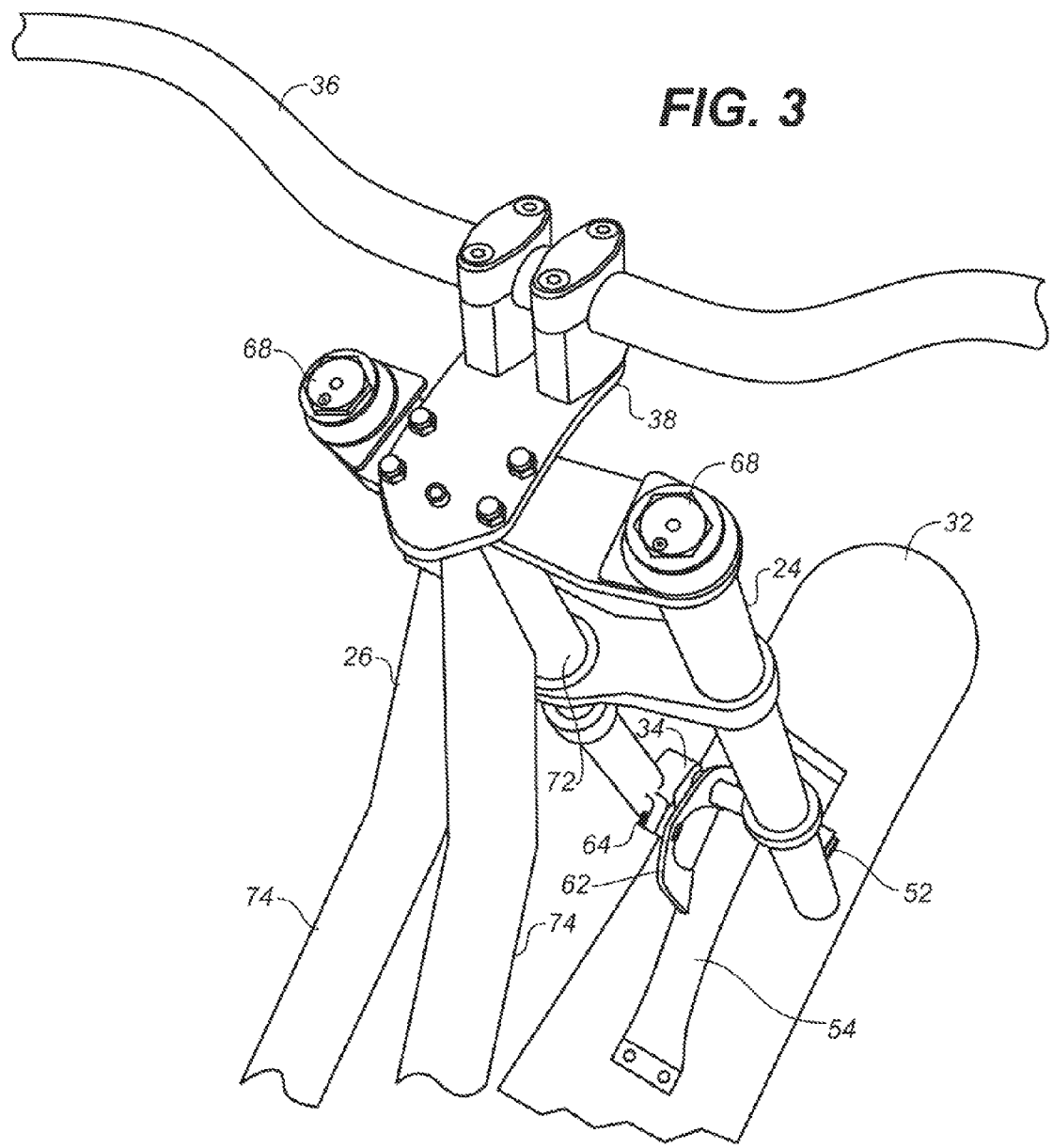
FIG. 3 is an oblique overhead view taken along the line 3-3 in FIG. 1 depicting in greater detail the front forks.

Preferably, the front fork 24 is a downhill cartridge fork manufactured for use in a bicycle. The front fork 24 depicted in the illustrations of FIGS. 1, 2 and 3 is a Marzocchi Super Monster downhill fork. As best illustrated in FIG. 2, the front fork 24 includes a pair of elongated cartridges 43 that extend from the upper end 38 thereof to the lower end 34. Included in the front fork 24, the cartridges 43 are spaced apart by:

1. a pair of upper spacers 44 located at the upper end 38 of the front fork 24;
2. an inverted, M-shaped spacer 46 located near the middle of the cartridges 43; and
3. a lower spacer 48 located at the lower end 34 of the front fork 24.

The upper spacers 44, spacer 46 and the lower spacer 48 hold the cartridges 43 apart and substantially parallel to each other along the entire length of the cartridges 43.

At the lower end 34 of the front fork 24, a shaft 52, included in the front fork 24, carries a curved front snowboard mounting bracket 54. The front snowboard 32 is rigidly fastened to opposite ends 56 of the front snowboard mounting bracket 54 so the center of mass of the front snowboard 32 combined with the front snowboard mounting bracket 54 is located slightly ahead of the shaft 52. Configured in this way, the front snowboard mounting bracket 54 together with the front snowboard 32 are freely rotatable about the shaft 52 in a plane that is perpendicular to the shaft 52 thereby permitting the front snowboard 32 to rotate unrestricted about the shaft 52 in conforming to a snowy slope's topography.

A U-shaped plate 62, best depicted in FIG. 3, is welded atop the front snowboard mounting bracket 54 above the shaft 52. A bolt 64 passes through a hole formed through the plate 62 and extends outward to one side thereof. Engagement between the projecting end of the bolt 64 and the front fork 24 immediately adjacent thereto limits rotation of the front snowboard 32 about the shaft 52 thereby preventing the projecting forward end of the front snowboard 32 from drooping excessively.

As depicted in FIG. 3, operating characteristics of the down hill front fork 24 can be adjusted by rotating nuts 68 that are located at the upper end thereof.

The frame 26 includes a tubular stem 72 that, similar to a conventional bicycle, surrounds a mating portion of the front fork 24. Configured in this way, the stem 72 and the front fork 24 permit rotation of the entire front fork 24 including the front snowboard 32 about a longitudinal axis of the stem 72.

Figure 5:
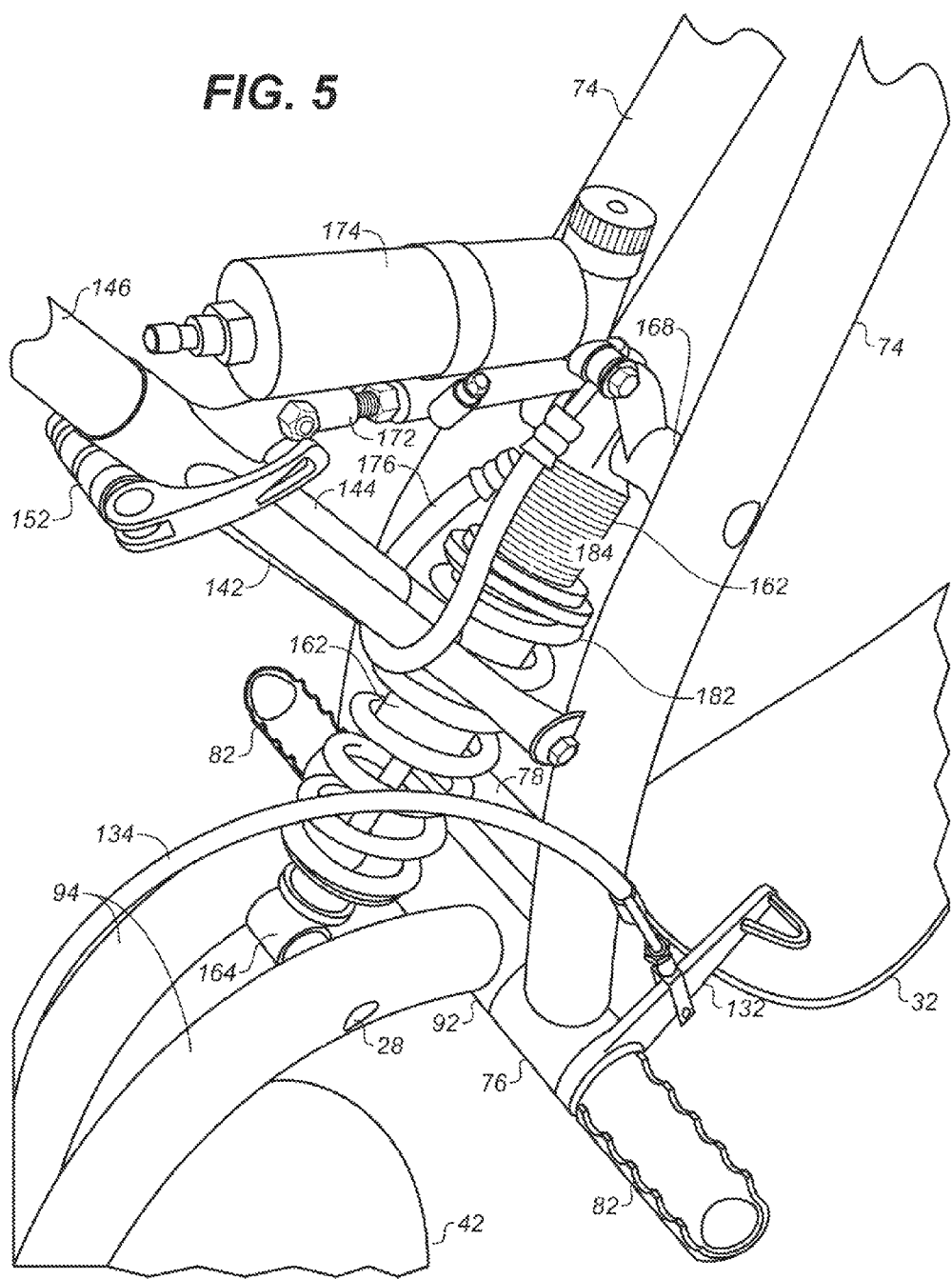
FIG. 5 is an oblique view of the juncture between the snow bike's swingarm and the snow bike's frame taken along the line 5-5 in FIG. 1 about which juncture the swingarm rotates with respect to the frame.

As best illustrated in FIG. 5, a pair of tubes 74, that as depicted in FIGS. 1-3 are welded to the stem 72, extend reward and downward from the stem 72 spreading apart into a V-shape that ends at a pair of a tubular swingarm pivot mounts 76. Ends of the tubes 74 are respectively welded both to the swingarm pivot mounts 76 and to opposite ends of a bracing tube 78 that is located above and slightly forward of the swingarm pivot mounts 76. Open, serrated footpegs 82, formed as extensions of the swingarm pivot mounts 76, respectively project outward from opposite sides of the frame 26 colinearly with the swingarm pivot mounts 76.

Located at the swingarm pivot mounts 76, extending therebetween and rotatably mounted thereto is a swingarm pivot tube 92. A curved pair of tubes 94 are welded to opposite ends of the swingarm pivot tube 92, and extend rearward from the frame 26 in a V-shape to a pair of rear snowboard mounting tubes 96, depicted best in the illustration of FIG. 4, to which the tubes 94 are also welded. A bolt 102 passes through opposite sides of a U-Shaped rear snowboard mounting bracket 104 and through the rear snowboard mounting tubes 96. The rear snowboard 42 is rigidly fastened to a lower surface of the rear snowboard mounting bracket 104 furthest from the rear snowboard mounting tubes 96. Configured in this way, the rear snowboard mounting bracket 104 together with the rear snowboard 42 fastened thereto are rotatable both:

1. about the bolt 102 in a plane that is perpendicular thereto; and
2. about an axis that is collinear with the swingarm pivot mounts 76.

Figure 4:
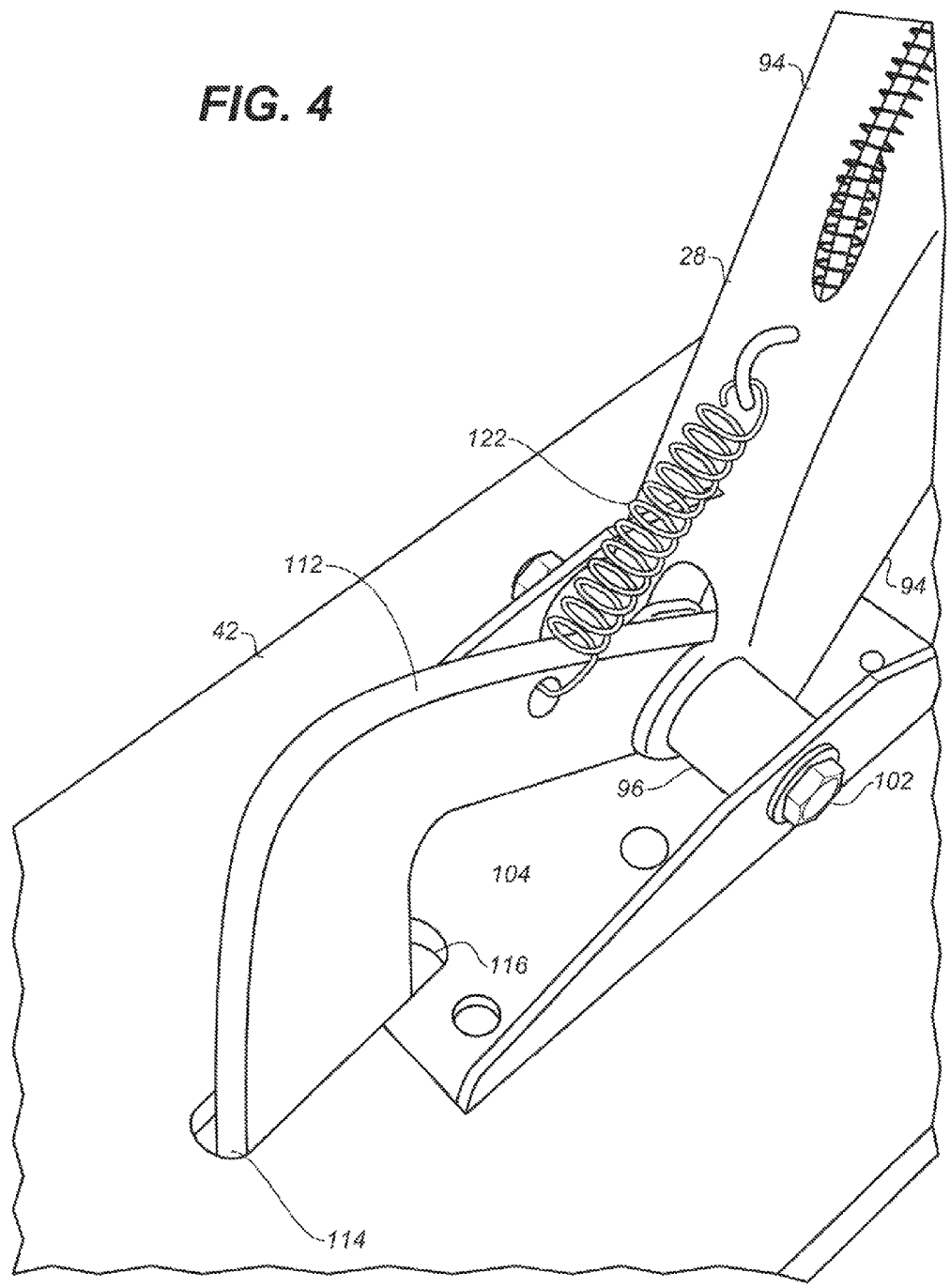
FIG. 4 is an oblique view of the snow bike's rear snowboard taken along the line 4-4 in FIG. 1 depicting in greater detail a brake that is located aft of where the rear snowboard attaches to the swingarm.

As best depicted in the illustration of FIG. 4, the bolt 102 also passes through one end of a V-shaped plate 112. An end of the V-shaped plate 112 furthest from the bolt 102 extends downward through an elongated hole 114 formed through the rear snowboard 42 and a notch 116 formed in the aft end of the rear snowboard mounting bracket 104. A coil spring 122 connects at one end to the swingarm 28 adjacent to a juncture between the tubes 94 above the rear snowboard mounting tubes 96, and at another end to the V-shaped plate 112. Configured in this way, the coil spring 122 draws upward the end of the V-shaped plate 112 furthest from the bolt 102 so in the absence of any other force acting on the V-shaped plate 112 that end of the V-shaped plate 112 is held within the hole 114 at or above a lower surface of the rear snowboard 42.

A foot brake 132, best depicted in the illustration of FIG. 5, is rotatably mounted on one side of the frame 26 between one of the swingarm pivot mounts 76 and the footpeg 82 that projects outward therefrom. A sheathed cable 134 connects the foot brake 132 to an end of the V-shaped plate 112 that extends forward from the rear snowboard mounting tubes 96 and the bolt 102 and away from the end of the V-shaped plate 112 that extends into the hole 114. Stepping on the foot brake 132 causes the end of the V-shaped plate 112 furthest from the bolt 102 to rotate downward through the hole 114 and project beneath the lower surface of the rear snowboard 42 into snow upon which the rear snowboard 42 rests. When the snow bike 20 is moving down a snowy slope, extending an end of the V-shaped plate 112 beneath the lower surface of the rear snowboard 42 into snow adjacent thereto impedes the descent of the snow bike 20. While the foot brake 132 is presently preferred for effecting rotation of the end of the V-shaped plate 112 furthest from the bolt 102 downward through the hole 114, those skilled in the art will recognize that, alternatively, a hand brake fastened to the handlebar 36 (not illustrated in any of the FIGs.) could effect the same rotation as an alternative to the foot brake 132.

Referring now to FIG. 5, lower ends of a pair of V-shaped seat pedestal tubes 142 extend upward respectively from each of the tubes 74 included in the frame 26 from a location thereon that is forward and above the swingarm pivot mounts 76 and the bracing tube 78. A seat post tube 144 extends downward from a junction between the seat pedestal tubes 142 to receive a seat post 146 atop which is fastened a bicycle seat 148 as depicted in FIGS. 1 and 2. A seat post lock 152, located at the top of the seat pedestal tubes 142, clamps the bicycle seat 148 tightly within the seat pedestal tubes 142.

A remote reservoir shock absorber 162 attaches at one end to a shock absorber pin 164 that extends between the tubes 94 of the swingarm 28 slightly reward from their attachment to the swingarm pivot tube 92. Another other end of the shock absorber 162 attaches to a shock absorber mounting bracket 168 that extends between the tubes 74 of the frame 26 ahead of where the seat pedestal tubes 142 attach to the tubes 74. An adjustable seat post support link 172 extends between the shock absorber mounting bracket 168 and the seat post tube 144 slightly below the seat post lock 152. A reservoir 174 for the shock absorber 162 is clamped to the seat post support link 172. A hydraulic hose 176 couples an end of the reservoir 174 nearest to the shock absorber mounting bracket 168 to an end of the shock absorber 162 nearest the shock absorber mounting bracket 168. As is well known in the art of remote piston reservoir shock absorbers, hydraulic fluid pressurized by nitrogen filling one end of the reservoir 174 pressurizes hydraulic fluid that fills the remainder of the reservoir 174, the hydraulic hose 176 and the shock absorber 162.

As further depicted in FIG. 5, a coil spring 182 encircles the shock absorber 162 between an end thereof immediately adjacent to the shock absorber pin 164 included in the swingarm 28 and locking adjusting nuts 184 that thread onto the shock absorber 162 adjacent to the shock absorber mounting bracket 168 included in the frame 26. Configured in this way, the shock absorber 162 and the coil spring 182 provide a damped sprung suspension for the swingarm 28 that urges the swingarm 28 to rotate away from the frame 26 about an axis that extends through the swingarm pivot mounts 76 of the frame 26.

Collectively, the attachment of the swingarm 28 to the frame 26 combined with the shock absorber 162 connected therebetween permit constrained rotation of the rear snowboard mounting bracket 104 together with the rear snowboard 42 secured thereto about the axis that is collinear with the swingarm pivot mounts 76. Conversely, the rear snowboard mounting bracket 104 together with the rear snowboard 42 secured thereto rotate freely and unrestricted about the bolt 102 in a plane that is perpendicular thereto thereby facilitating conformance of the rear snowboard 42 to a snowy slope's topography.

Figure 6:
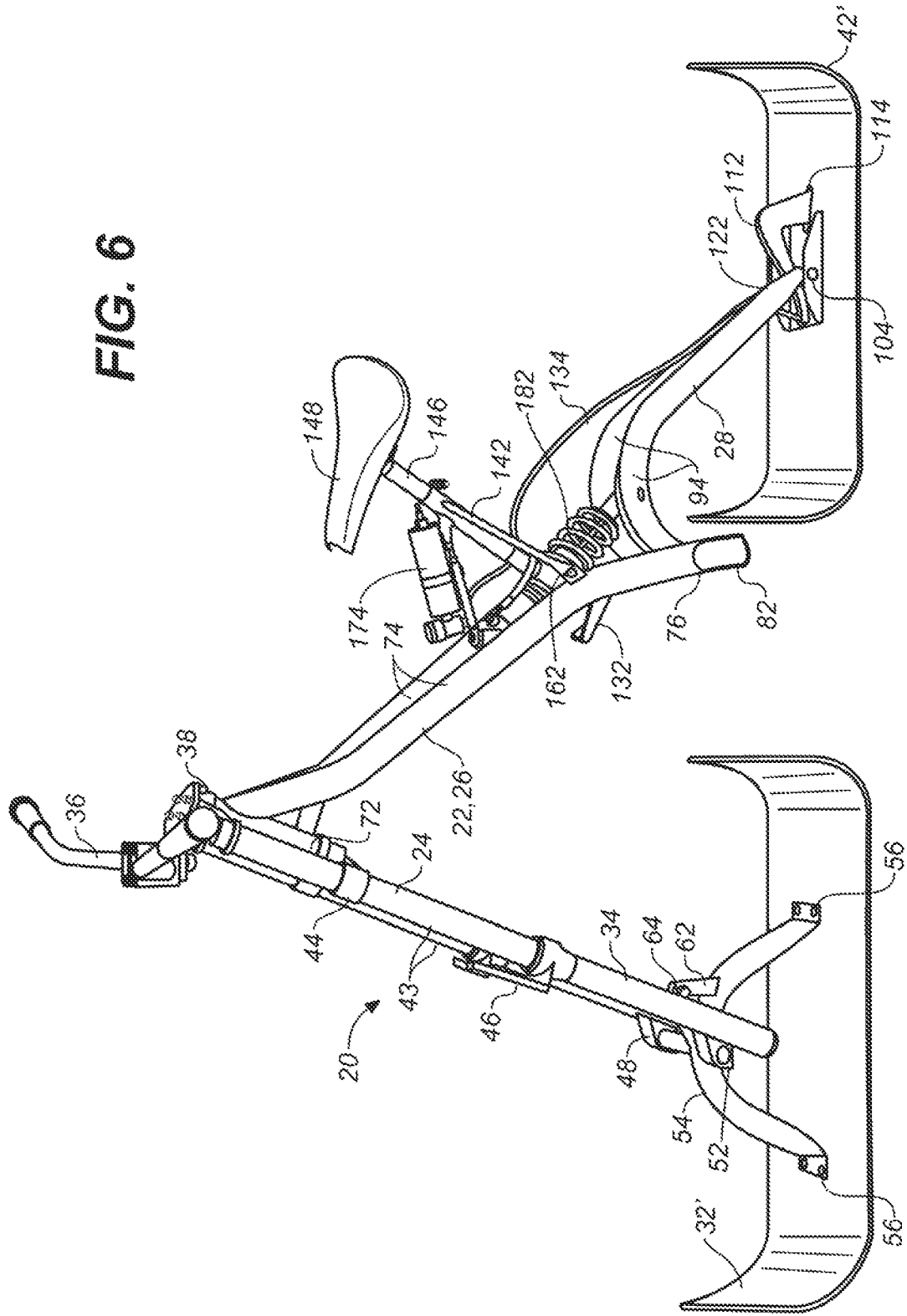
FIG. 6 is an elevational view depicting the snow bike illustrated in FIG. 1 equipped with alternative embodiment front and rear snowboards the tips of which curve substantially above the respective snowboard at the middle thereof.
Figure 7:
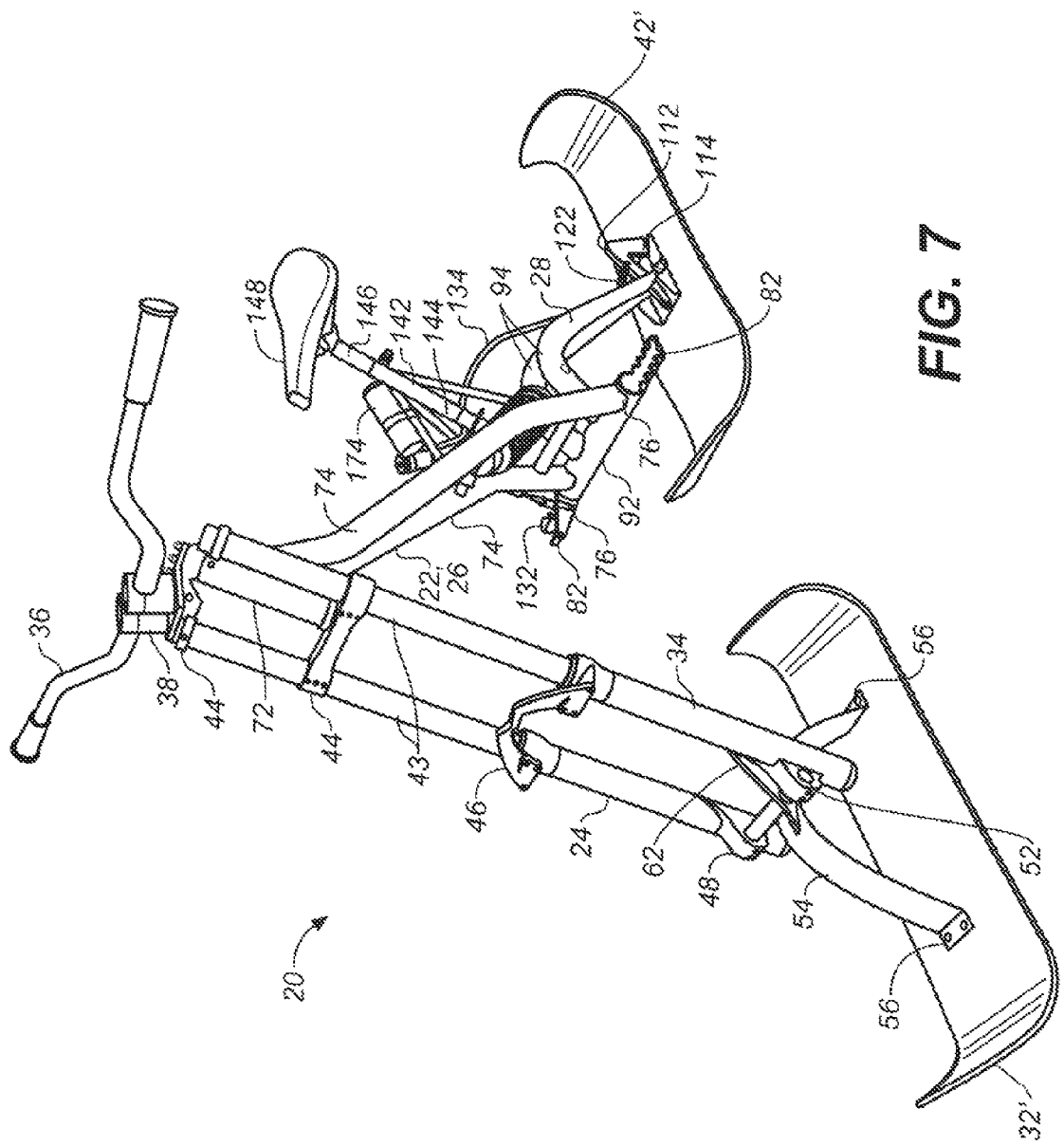
FIG. 7 is an oblique frontal view of the snow bike illustrated in FIG. 2 equipped with the alternative embodiment snowboards depicted in FIG. 6.

FIGS. 6 and 7 depict an embodiment of the snow bike 20 that includes alternative embodiment front and rear snowboards 32' and 42'. The front and rear snowboards 32' and 42' respectively have shapes that differ from the front snowboard 32 and rear snowboard 42 illustrated in FIGS. 1-5. Specifically, terminal ends of the front and rear snowboards 32' and 42' curve upward higher than ends of the front snowboard 32 and rear snowboard 42 depicted in FIGS. 1-5 to a height that is no less than six inches (6") above locations where the front snowboard mounting bracket 54 and the rear snowboard mounting bracket 104 respectively attach to the front and rear snowboards 32' and 42'. Preferably, terminal ends of the front and rear snowboards 32' and 42' curve upward to a height that is at least ten inches (10") above locations where the front snowboard mounting bracket 54 and the rear snowboard mounting bracket 104 respectively attach to the front and rear snowboards 32' and 42'.

Although the present invention has been described in terms of the presently preferred embodiment, it is to be understood that such disclosure is purely illustrative and is not to be interpreted as limiting. Consequently, without departing from the spirit and scope of the disclosure, various alterations, modifications, and/or alternative applications of the disclosure will, no doubt, be suggested to those skilled in the art after having read the preceding disclosure.

Accordingly, it is intended that the following claims be interpreted as encompassing all alterations, modifications, or alternative applications as fall within the true spirit and scope of the disclosure including equivalents thereof. In effecting the preceding intent, the following claims shall:

1. not invoke paragraph 6 of 35 U.S.C. §112 as it exists on the date of filing hereof unless the phrase "means for" appears expressly in the claim's text;
2. omit all elements, steps, or functions not expressly appearing therein unless the element, step or function is expressly described as "essential" or "critical;"
3. not be limited by any other aspect of the present disclosure which does not appear explicitly in the claim's text unless the element, step or function is expressly described as "essential" or "critical;" and
4. when including the transition word "comprises" or "comprising" or any variation thereof, encompass a non-exclusive inclusion, such that a claim which encompasses a process, method, article, or apparatus that comprises a list of steps or elements includes not only those steps or elements but may include other steps or elements not expressly or inherently included in the claim's text.

What is claimed is:

1. A snow bike (20) having a three (3) piece chassis (22), the snow bike (20) being adapted for conveying a rider thereon across a surface of a snowy slope, the snow bike (20) comprising:
   a. a frame (26) disposed about a center of the chassis (22);
   b. an elongated front fork (24) that is secured at an upper end of the front fork (24) to a front end of the frame (26) so the front fork (24) is rotatable with respect to the frame (26) about an axis that is oriented substantially parallel to a longitudinal axis of the front fork (24), the upper end of the front fork (24) that extends above the frame (26) having a handlebar (36) fixed thereto to permit the rider to establish an angular relationship between the front fork (24) and the frame (26), and a lower end of the front fork (24) having attached thereat:
      i. a front snowboard mounting bracket (54) that is located thereat between a pair of tines thereof;
      ii. a shaft (52) that passes through the front snowboard mounting bracket (54) so the front snowboard mounting bracket (54) is rotatable about the shaft (52), the shaft (52) spanning between tines of the front fork (24) that are located on opposite sides of the front snowboard mounting bracket (54) and being secured respectively at opposite ends thereof to the tines; and
      iii. an elongated front snowboard (32) having a lower surface adapted for contacting snow and also having both a length and a width, the front snowboard (32) being securely fastened to the front snowboard mounting bracket (54), the length of the front snowboard (32) being pointable along a direction in which the snow bike (20) travels across the surface of the snowy slope by rotating the front fork (24) with respect to the frame (26),
      the combined front snowboard mounting bracket (54) and the front snowboard (32) being free for unconstrained rotation about the shaft (52) to thereby adapt the lower surface of the front snowboard (32) for conforming to topography of a snowy slope while the snow bike (20) moves across the surface of the snowy slope; and
   c. a swingarm (28), that projects rearward from a rear end of the frame (26) furthest from the front fork (24), having a front end that is secured to the frame (26) by a pair of swingarm pivot mounts (76) included in the frame (26), the swingarm pivot mounts (76) respectively confronting opposite sides of the swingarm (28)

for permitting the swingarm (28) to rotate with respect to the frame (26) about an axis that is oriented parallel to the swingarm pivot mounts (76), an end of the swingarm (28) furthest from the frame (26) having attached thereat:
i. a rear snowboard mounting bracket (104);
ii. a bolt (102) that passes through both:
   1) the end of the swingarm (28) furthest from the frame (26); and
   2) the rear snowboard mounting bracket (104);
iii. an elongated rear snowboard (42) that is securely fastened beneath the rear snowboard mounting bracket (104) having a lower surface adapted for contacting snow;
iv. a V-shaped plate (112) through one end of which the bolt (102) also passes and about which the plate is rotatable, rotation of the V-shaped plate (112) in one direction about the bolt (102) extending an end of the V-shaped plate (112) furthest from the bolt (102) progressively through both:
   1) a notch (116) formed in one edge of the rear snowboard mounting bracket (104); and then
   2) a hole (114) that pierces through the rear snowboard (42) where the rear snowboard (42) is securely fastened beneath the rear snowboard mounting bracket (104),
   such rotation of the V-shaped plate (112) extending the end thereof that is furthest from the bolt (102) downward into snow that is in contact with the lower surface of the rear snowboard (42) for impeding descent of the snow bike (20) across the surface of the snowy slope; and
v. a coil spring (122) that connects at one end to the swingarm (28) and at an opposite end of the coil spring (122) to the V-shaped plate (112) near the bolt (102) for applying a force to the V-shaped plate (112) that urges rotation of the V-shaped plate (112) in a direction that retracts the end of the V-shaped plate (112) furthest from the bolt (102) upward out of snow that is in contact with the lower surface of the rear snowboard (42) to thereby ease descent of the snow bike (20) across the surface of the snowy slope upon rotation of the V-shaped plate (112) by force applied thereto by the coil spring (122);
d. an elongated shock absorber (162) included in the chassis that connects at one end to the frame and at an opposite end to the swingarm (28) for inhibiting rotation of the swingarm (28) with respect to the frame (26),
whereby the lower surface of the rear snowboard (42) is conformable to topography of a snowy slope while the snow bike (20) moves across the surface of the snowy slope by a combination of:
   i. free, unconstrained rotation of the combined rear snowboard mounting bracket (104) and the rear snowboard (42) about the bolt (102) with respect to the end of the swingarm (28) furthest from the frame (26); and
   ii. rotation of the swingarm (28) with respect to the frame (26) that is inhibited by the shock absorber (162) that is connected therebetween.

2. The snow bike (20) of claim 1 wherein the end of the V-shaped plate (112) furthest from the bolt (102) extends downward into snow beneath the rear snowboard (42) responsive to a rider of the snow bike (20) depressing a foot brake (132) included in the snow bike (20).

3. The snow bike (20) of claim 1 wherein the end of the V-shaped plate (112) furthest from the bolt (102) extends downward into snow beneath the rear snowboard (42) responsive to a rider of the snow bike (20) manually operating a hand brake included in the snow bike (20).

4. The snow bike (20) of claim 3 the hand brake is secured to the handlebar (36).

\* \* \* \* \*